(12) United States Patent
Ho et al.

(10) Patent No.: US 9,703,054 B2
(45) Date of Patent: Jul. 11, 2017

(54) ALIGNING AND DIRECTLY OPTICALLY COUPLING PHOTODETECTORS TO OPTICAL DEMULTIPLEXER OUTPUTS IN A MULTICHANNEL RECEIVER OPTICAL SUBASSEMBLY

(71) Applicant: Applied Optoelectronics, Inc., Sugar Land, TX (US)

(72) Inventors: I-Lung Ho, Sugar Land, TX (US); Luohan Peng, Cypress, TX (US); Joyce Li, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/362,796

(22) Filed: Nov. 28, 2016

(65) Prior Publication Data
US 2017/0075080 A1    Mar. 16, 2017

Related U.S. Application Data

(60) Division of application No. 14/088,883, filed on Nov. 25, 2013, now Pat. No. 9,509,433, which is a continuation-in-part of application No. 13/893,802, filed on May 14, 2013, now Pat. No. 9,039,303.

(51) Int. Cl.
| | |
|---|---|
| *G02B 6/42* | (2006.01) |
| *G02B 6/12* | (2006.01) |
| *H04J 14/02* | (2006.01) |
| *H04B 10/40* | (2013.01) |
| *G02B 6/36* | (2006.01) |
| *H04B 10/60* | (2013.01) |

(Continued)

(52) U.S. Cl.
CPC ....... *G02B 6/4224* (2013.01); *G02B 6/12019* (2013.01); *G02B 6/4292* (2013.01); *G02B 6/4295* (2013.01); *H04B 10/66* (2013.01); *H04J 14/025* (2013.01)

(58) Field of Classification Search
CPC ...... H04J 14/025; H04J 14/0246; H04B 10/40
USPC ........ 385/14, 16, 24, 88, 89, 92, 94; 398/68, 398/92, 70, 79
See application file for complete search history.

(56) References Cited

U.S. PATENT DOCUMENTS

| | | | | |
|---|---|---|---|---|
| 6,652,161 B2 * | 11/2003 | Grann | ................ | G02B 6/29358 385/47 |
| 7,599,411 B2 * | 10/2009 | Kim | ................... | G02B 6/12004 372/23 |
| 9,225,428 B1 * | 12/2015 | Peng | ................... | H04Q 11/0005 |

(Continued)

*Primary Examiner* — Akm Enayet Ullah
(74) *Attorney, Agent, or Firm* — Grossman Tucker Perreault & Pfleger, PLLC; Norman S. Kinsella (57) ABSTRACT

A multi-channel receiver optical subassembly (ROSA) such as an arrayed waveguide grating (AWG), with outputs directly optically coupled to respective photodetectors such as photodiodes. In one embodiment, an AWG may be configured such that optical components of the AWG do not interfere with direct optical coupling, and the wire bonding points on the photodiodes may also be configured such that wire bonding does not interfere with direct optical coupling. The photodetectors may also be mounted on a photodetector mounting bar with a pitch sufficiently spaced to allow connection to floating grounds. A passive alignment technique may be used to determine the mounting locations on the photodetector mounting bar such that the photodetectors are aligned with the optical outputs.

8 Claims, 8 Drawing Sheets

(51) Int. Cl.
*H04Q 11/00* (2006.01)
*H04B 10/66* (2013.01)

(56) References Cited

U.S. PATENT DOCUMENTS

| | | | |
|---|---|---|---|
| 9,419,781 B2 * | 8/2016 | Lee | H04L 7/0062 |
| 9,479,259 B2 * | 10/2016 | Ho | H04B 10/40 |
| 9,496,959 B1 * | 11/2016 | Nagarajan | H04B 10/40 |
| 2012/0257902 A1 * | 10/2012 | Deng | H04B 10/506 398/152 |
| 2014/0161457 A1 * | 6/2014 | Ho | H04B 10/40 398/79 |
| 2015/0256261 A1 * | 9/2015 | Ho | G02B 6/43 398/139 |
| 2017/0019168 A1 * | 1/2017 | Menard | G02B 6/29395 |
| 2017/0048015 A1 * | 2/2017 | O'Daniel | G02B 6/4219 |

* cited by examiner

ALIGNING AND DIRECTLY OPTICALLY COUPLING PHOTODETECTORS TO OPTICAL DEMULTIPLEXER OUTPUTS IN A MULTICHANNEL RECEIVER OPTICAL SUBASSEMBLY

CROSS-REFERENCE TO RELATED APPLICATIONS

The present application is a divisional of U.S. patent application Ser. No. 14/088,883 filed Nov. 25, 2013, which is a continuation-in-part of U.S. patent application Ser. No. 13/893,802 filed May 14, 2013, both of which are fully incorporated herein by reference.

TECHNICAL FIELD

The present disclosure relates to optical transceivers and more particularly, to aligning and directly optically coupling photodetectors to optical demultiplexer outputs in a multi-channel receiver optical subassembly (ROSA).

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA), a multi-channel receiver optical subassembly (ROSA), and associated circuitry. One challenge with such OLT transceiver modules is accommodating the multi-channel TOSA, ROSA and circuitry in the relatively small space available in an OLT module. Designing a subassembly, such as the ROSA, with a smaller size presents potential problems with optical coupling between optical components in the subassembly. Limitations on the power budget of multiple channel optical transceivers present an additional challenge because higher receiver sensitivity may be required but difficult to achieve given the limited space for optical and opto-electronic components.

In the ROSA, multiple photodiodes are optically coupled to multiple outputs from an optical demultiplexer, such as an arrayed waveguide grating (AWG), for receiving multiple optical signals over multiple channels. To provide the coupling efficiency needed for a desired receiver sensitivity, these optical couplings are often made using a fiber array and/or lenses. The limited space within a smaller sized ROSA housing, however, may not be sufficient to accommodate fiber arrays and lenses used for such optical couplings. Aligning the photodiodes with the optical demultiplexer outputs may also be difficult without using expensive active alignment techniques and equipment.

BRIEF DESCRIPTION OF THE DRAWINGS

These and other features and advantages will be better understood by reading the following detailed description, taken together with the drawings wherein.

DETAILED DESCRIPTION

A multi-channel receiver optical subassembly (ROSA), consistent with embodiments described herein, includes an optical demultiplexer, such as an arrayed waveguide grating (AWG), with outputs directly optically coupled to respective photodetectors such as photodiodes. In one embodiment, an AWG may be configured such that optical components of the AWG do not interfere with direct optical coupling, and the wire bond points on the photodiodes may also be configured such that wire bonding does not interfere with direct optical coupling. The photodiodes may also be mounted on a photodetector mounting bar with a pitch sufficiently spaced to allow connection to floating grounds. A passive alignment technique may be used to determine the mounting locations on the photodetector mounting bar such that the photodetectors are aligned with the optical outputs. A compact multi-channel optical transceiver may include the multi-channel ROSA, and the optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. The term "directly optically coupled" refers to an optical coupling without any intermediate optical components such as lenses or fiber arrays.

Figure 1:
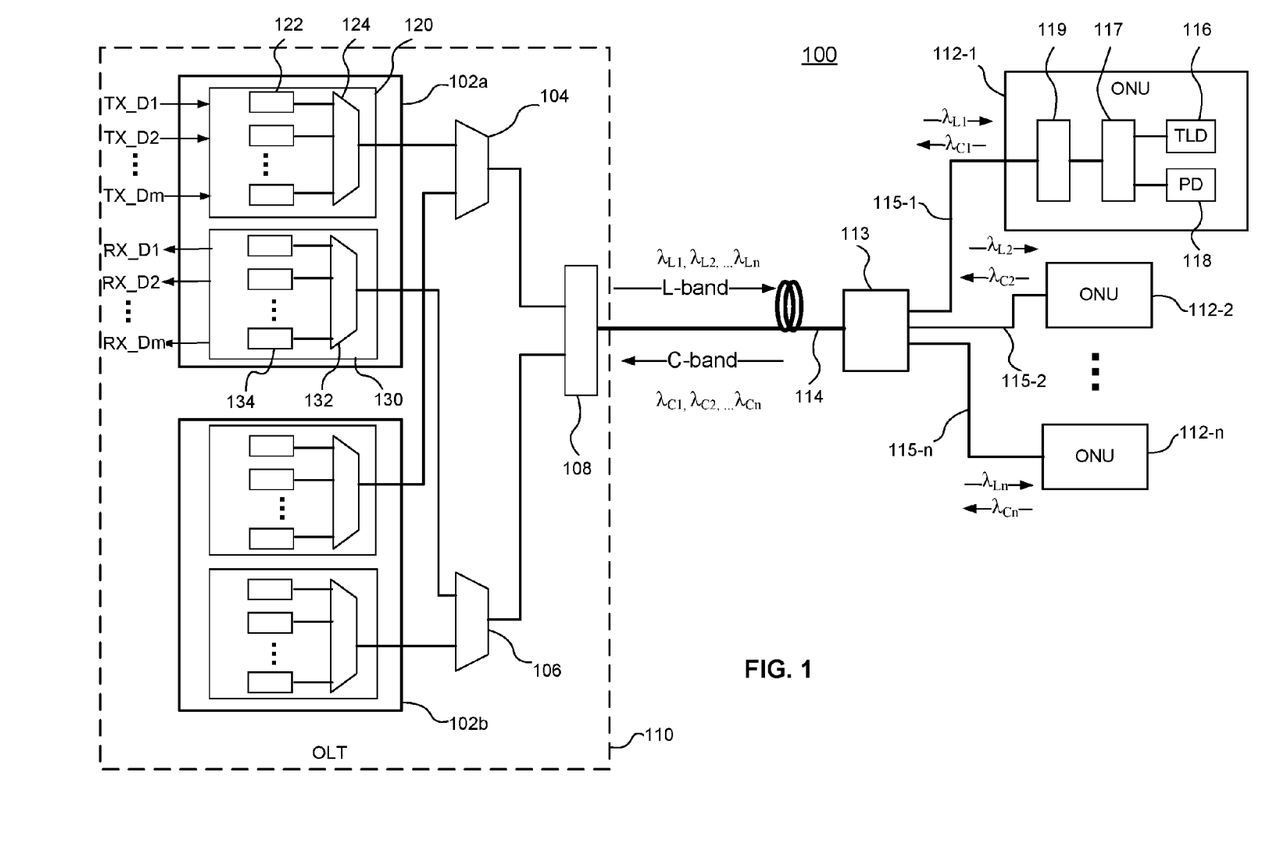
FIG. 1 is a functional block diagram of a wavelength division multiplexed (WDM) passive optical network (PON) including at least one compact multi-channel optical transceiver, consistent with embodiments of the present disclosure.

Referring to FIG. 1, a WDM-PON 100 including one or more multi-channel optical transceivers 102a, 102b, consistent with embodiments of the present disclosure, is shown and described. The WDM-PON 100 provides a point-to-multipoint optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g., $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ... $\lambda_{Cn}$). Other wavelengths and wavelength bands are also within the scope of the system and method described herein.

The branching point 113 may demultiplex a downstream WDM optical signal (e.g., $\lambda_{L1}$, $\lambda_{L2}$, ... $\lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}$, $\lambda_{C2}$, ... $\lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). The laser 116 may include a tunable laser configured to be tuned to the assigned channel wavelength. This embodiment of the ONU 112-1 may also include a diplexer 117 coupled to the laser 116 and the photodetector 118 and a C+L band filter 119 coupled to the diplexer 117, which allow the L-band channel wavelength ($\lambda_{L1}$) to be received by the ONU 112-1 and the C-band channel wavelength ($\lambda_{C1}$) to be transmitted by the ONU 112-1.

The OLT 110 may be configured to generate multiple optical signals at different channel wavelengths (e.g., $\lambda_{L1}$, $\lambda_{L2}$, ... $\lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g., $\lambda_{C1}$, $\lambda_{C2}$, ... $\lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths. As will be described in greater detail below, the multi-channel TOSA 120 and ROSA 130 are configured and arranged to fit within a relatively small transceiver housing and to facilitate heat transfer within the transceiver housing.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}, \lambda_{L2}, \ldots \lambda_{Lm}$). The TOSA 120 may also include a temperature control system for controlling temperature of the lasers 122 and the multiplexer 124 to maintain a desired wavelength precision or accuracy.

In some embodiments, the lasers 122 may be tunable lasers that generate the optical signals at the respective channel wavelengths. In other embodiments, the lasers 122 may generate optical signals over a band of channel wavelengths and filtering and/or multiplexing techniques may be used to produce the assigned channel wavelengths. Examples of optical transmitters including a laser array and AWG are disclosed in greater detail in U.S. patent application Ser. No. 13/543,310 (U.S. Patent Application Pub. No. 2013-0016971), U.S. patent application Ser. No. 13/357,130 (U.S. Patent Application Pub. No. 2013-0016977), and U.S. patent application Ser. No. 13/595,505 (U.S. Patent Application Pub. No. 2013-0223844), all of which are fully incorporated herein by reference. In the illustrated embodiment, the OLT 110 further includes a multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

One embodiment of the multi-channel ROSA 130 includes a demultiplexer 132 for separating the respective upstream channel wavelengths (e.g., $\lambda_{C1}, \lambda_{C2}, \ldots \lambda_{Cn}$). An array of photodetectors 134, such as photodiodes, detects the optical signals at the respective separated upstream channel wavelengths and provides the received data signals (RX_D1 to RX_Dm). As described in greater detail below, the outputs of the demultiplexer 132 may be aligned with and directly optically coupled to the photodetectors 134 to provide a relatively high coupling efficiency. In the illustrated embodiment, the OLT 110 further includes a demultiplexer 106 for demultiplexing the upstream WDM optical signal into first and second WDM optical signals provided to the respective multi-channel ROSA in each of the transceivers 102a, 102b. The OLT 110 also includes a diplexer 108 between the trunk path 114 and the multiplexer 104 and the demultiplexer 106 such that the trunk path 114 carries both the upstream and the downstream channel wavelengths. The transceivers 102a, 102b may also include other components, such as laser drivers, transimpedance amplifiers (TIAs), and control interfaces, used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. In one example, the downstream L-band link between the OLT transceivers 102a, 102b and the ONUs 112-1 to 112-n may support a power budget of at least about 26 dB and the upstream C-band link between the ONUs 112-1 to 112-n and the OLT transceivers 102a, 102b may support a power budget of at least about 23 dB. One example of the WDM-PON 100 may operate at 1.25 Gbaud using 8B/10B encoded on-off keying as the modulation scheme. Other data rates and modulation schemes may also be used.

As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. To facilitate use of the multiplexer 104 and the demultiplexer 106, the range of channel wavelengths may skip channels (e.g., 2 channels) in the middle of the range. According to one example of a multi-channel optical transceiver used in the WDM-PON 100, the desired wavelength precision or accuracy is ±0.05 nm, the desired operating temperature is between −5 and 70° C., and the desired power dissipation is about 16.0 W.

Figure 2:
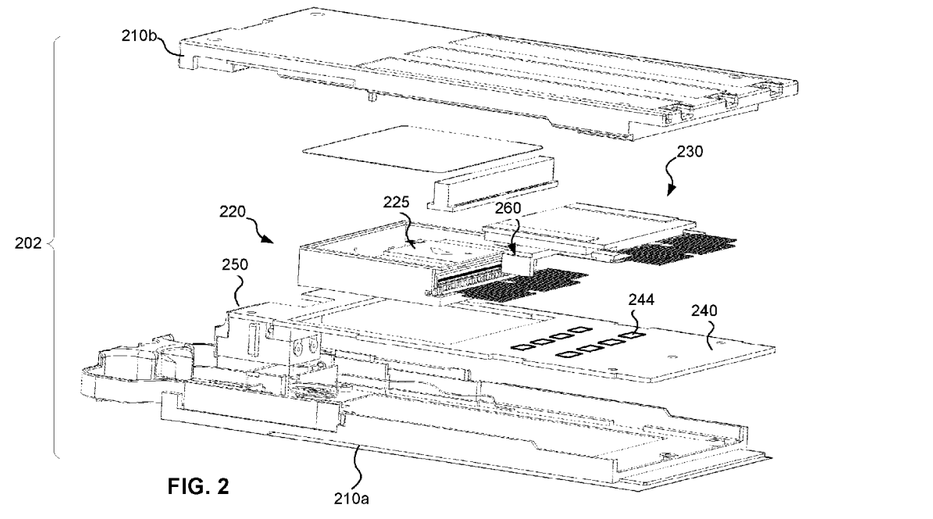
FIG. 2 is an exploded view of a compact multi-channel optical transceiver including a multi-channel TOSA, ROSA and circuit board, consistent with an embodiment of the present disclosure.
Figure 3:
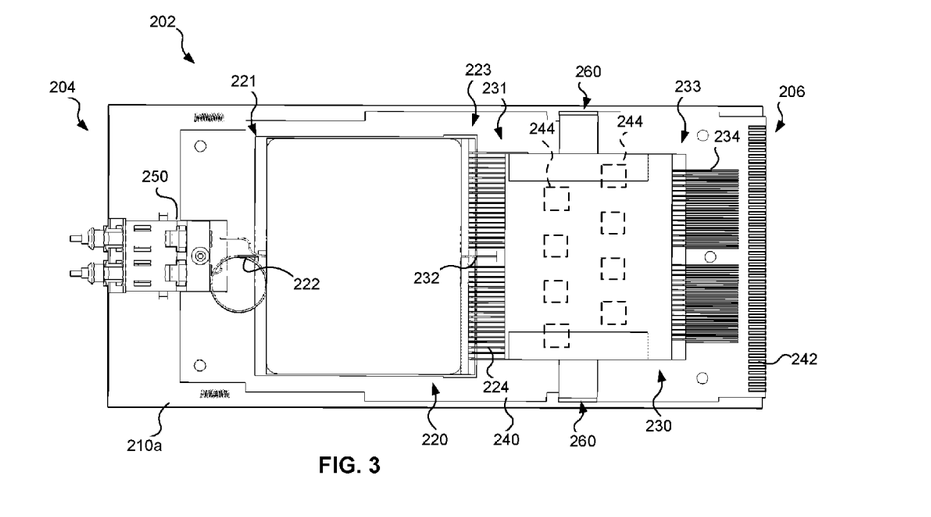
FIG. 3 is a top view inside the compact multi-channel optical transceiver shown in FIG. 2.

Referring to FIGS. 2 and 3, one embodiment of a compact multi-channel optical transceiver module 202 is shown and described in greater detail. As discussed above, multiple multi-channel transceiver modules may be used in an OLT of a WDM-PON to cover a desired channel range. The transceiver module 202 may thus be designed to have a relatively small form factor with minimal space. The compact optical transceiver module 202 generally provides an optical input and output at an optical connection end 204 and electrical input and output at an electrical connection end 206. The transceiver module 202 includes a transceiver housing 210a, 210b enclosing a multi-channel TOSA 220, a multi-channel ROSA 230, a circuit board 240, and a dual fiber adapter 250 directly linked to the TOSA 220 and the ROSA 230 for providing the optical input and output. The transceiver housing 210a, 210b may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm.

In the example embodiment, the TOSA 220 is located in the transceiver housing 210a, 210b proximate the optical connection end 204 and the ROSA 230 is located in the transceiver housing 210a, 210b proximate the electrical connection end 206. The circuit board 240 is located proximate the transceiver housing bottom portion 210a and extends to the electrical connection end 206. The ROSA 230 is located between the circuit board 240 and the transceiver housing top portion 210b. As will be described in greater detail below, the ROSA 230 may be spaced from the circuit board 240 to provide space for circuit board components and may be inverted and positioned proximate the transceiver housing top portion 210b to facilitate heat transfer from the ROSA 230 to the housing top portion 210b.

The TOSA 220 and the ROSA 230 each have an optical connection end 221, 231 directed toward the transceiver optical connection end 204 and an electrical connection end 223, 233 directed toward the transceiver electrical connection end 206. The optical connection ends 221, 231 of the TOSA 220 and the ROSA 230 are optically coupled to the dual fiber adapter 250 with respective optical fibers 222, 232, respectively, to provide a direct link between the adapter 250 and both the TOSA 220 and the ROSA 230. The electrical connection ends 223, 233 of the TOSA 220 and the ROSA 230 are electrically connected to the circuit board 240 using TOSA pins 224 and ROSA pins 234, respectively, soldered to conductive pads on the circuit board 240. The circuit board 240 includes input/output conductive pads 242 proximate the transceiver electrical connection end 206. Input conductive pads 242 may be provided on one side of the circuit board 240 for providing RF input to the TOSA 220 and output conductive pads 242 may be provided on the other side of the circuit board 240 for providing output from the ROSA 230.

The dual fiber adapter 250 is also configured to receive pluggable optical connectors, such as LC connectors (not shown), to connect the TOSA 220 and ROSA 230, respectively, to fiber optic cables (not shown). When the pluggable optical connectors are plugged into the dual fiber adapter 250, the adapter 250 establishes an optical coupling between the TOSA 220 and the ROSA 230 and the respective optical fibers in the fiber-optic cables, which carry the optical signals to and from the transceiver.

The multi-channel TOSA 220 includes an array of lasers (not shown in FIGS. 2 and 3) coupled to a multiplexer 225 such as an AWG. A temperature control system may be used to control the temperature of the individual lasers to provide a desired wavelength with a desired wavelength precision or accuracy. In one example, the temperature of each laser is maintained within±0.5° C. in the operating range between −5 and 70° C. to maintain a wavelength precision or accuracy of about±0.05 nm. The temperature control system may include a thermoelectric cooler (TEC), and the multiplexer 225 and/or the lasers may be mounted on the TEC in a bottom region of the TOSA 220. Examples of the TOSA are described in greater detail in U.S. patent application Ser. No. 13/708,064 (U.S. Patent Application Pub. No. 2014-0161455) and U.S. patent application Ser. No. 13/708,569 (U.S. Patent Application Pub. No. 2014-0161457), which are fully incorporated herein by reference.

Although the illustrated embodiment shows the TOSA 220 with the bottom region facing the transceiver housing bottom portion 210a, the TOSA 220 may also be inverted and the bottom of the TOSA 220 may be thermally coupled to (e.g., touching) the transceiver housing top portion 210b. The transceiver module 202 may be mounted in a cage assembly with the transceiver housing top portion 210b being located proximate a heat sink at the top of the cage. Because the TOSA 220 generates most of the heat from the bottom portion (e.g., from the TEC), the upside down or inverted configuration may provide better thermal dissipation and improve the overall working temperature range of the transceiver module 202.

The multi-channel ROSA 230 includes a demultiplexer, such as an AWG, coupled to an array of photodetectors, such as photodiodes, as will be described in greater detail below. The printed circuit board 240 may include circuitry and electronic components such as laser diode drivers, transimpedance amplifiers (TIAs), control interfaces, and temperature control circuitry. In the example embodiment, the circuit board 240 includes integrated circuit (IC) components 244 electrically connected to the TOSA 220 and the ROSA 230, for example, using conductive traces on or in the circuit board 240. The IC components 244 are mounted on at least one side of the circuit board 240 between the circuit board 240 and the ROSA 230 and may also be mounted on the opposite side of the circuit board 240. The IC components 244 may be arranged on the circuit board 240 in one or more rows of IC components 244.

In one embodiment, the IC components are combination IC components including a laser diode driver and a photodiode limiting amplifier. Each laser diode driver is electrically connected to a respective laser diode on the TOSA 220 and each photodiode limiting amplifier is electrically connected to a respective photodiode on the ROSA 230. In the example embodiment of a sixteen (16) channel transceiver, for example, the circuit board 240 may include 16 combination IC components 244. The 16 combination IC components may be arranged in two rows of four IC components 244 on each side of the circuit board 240.

In the example embodiment, ROSA supports 260 hold and support the ROSA 230 on each side of the ROSA 230. The ROSA supports 260 are mounted to the transceiver housing bottom portion 210a such that the ROSA 230 is spaced from the circuit board 240. The illustrated embodiment of the ROSA supports 260 have an L-shaped portion such that the ROSA supports 260 extend from sides of the transceiver housing bottom portion 210a and support the ROSA 230 without interfering with the circuit board 240 or any components thereon.

Figure 4:
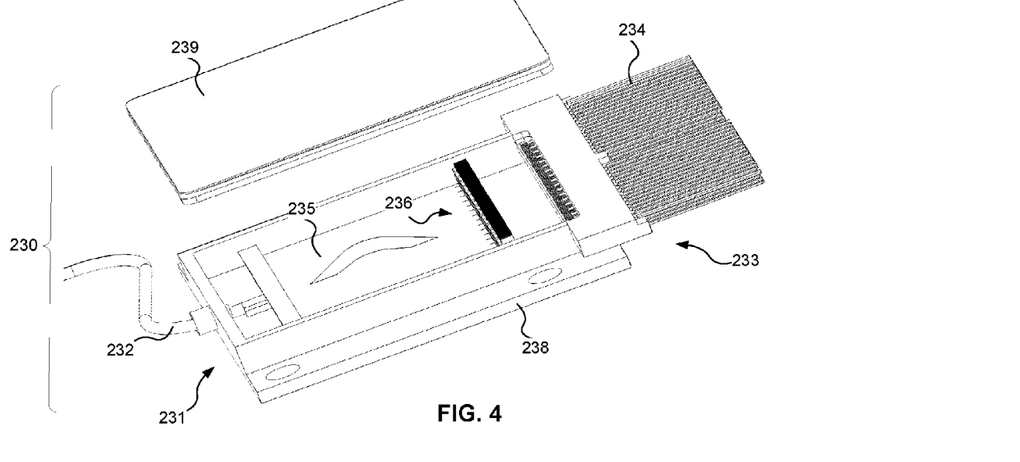
FIG. 4 is an exploded perspective view of a multi-channel ROSA for use in a compact multi-channel optical transceiver, consistent with an embodiment of the present disclosure.
Figure 5:
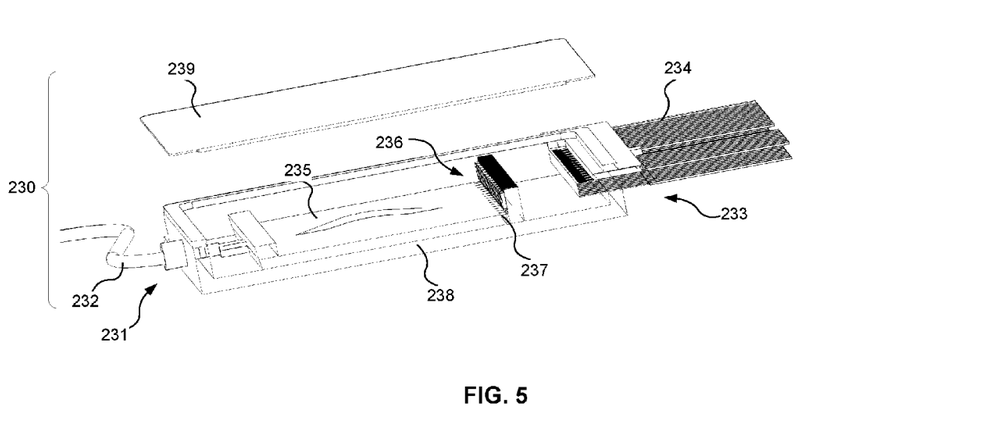
FIG. 5 is a cross-sectional view of the multi-channel ROSA shown in FIG. 4.
Figure 6:
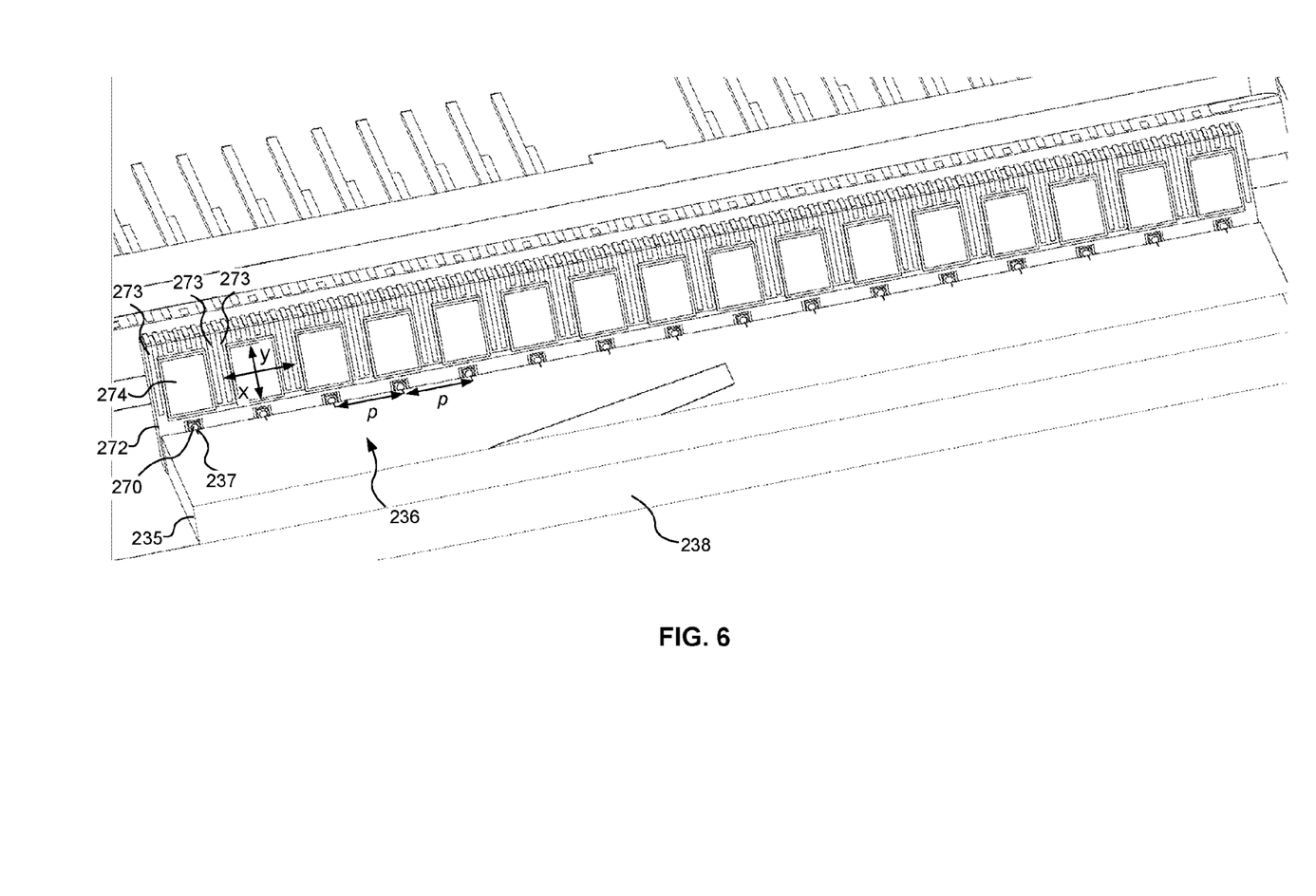
FIG. 6 is a cross-sectional front perspective view of the array of photodetectors directly optically coupled to the respective optical outputs of the optical demultiplexer in the ROSA shown in FIG. 4.
Figure 7:
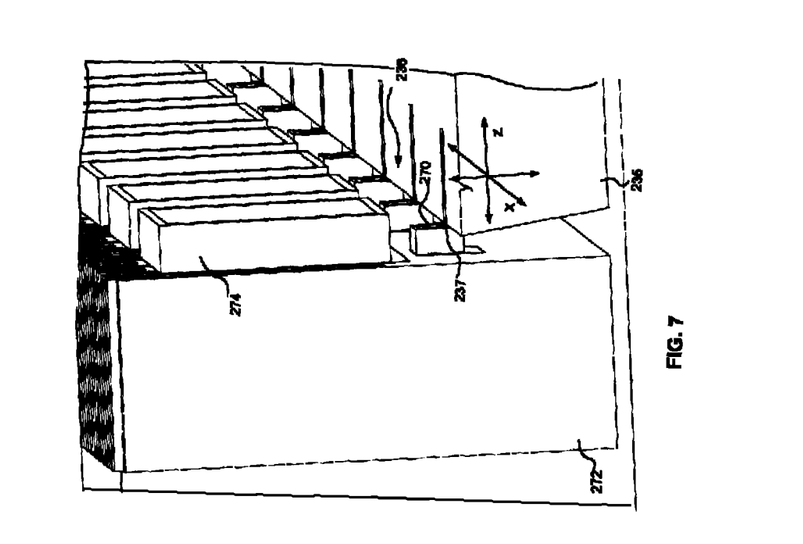
FIG. 7 is an enlarged, side perspective view of the array of photodetectors directly optically coupled to the respective optical outputs of the optical demultiplexer in the ROSA shown in FIG. 4.

Referring to FIGS. 4 and 5, an embodiment of the multi-channel ROSA 230 is described in greater detail. The ROSA 230 includes a demultiplexer 235, such as an AWG, mounted on a ROSA base portion 238. Optical outputs 237 of the demultiplexer 235 are optically coupled to an array of photodetectors 236, such as photodiodes. An input of the demultiplexer 235 is optically coupled to the input optical fiber 232 at the optical connection end 231 and the output of the photodetectors 236 are electrically connected to the ROSA pins 234 at the electrical connection end 233. A ROSA cover 239 covers the ROSA base portion 238 and encloses the demultiplexer 235 and array of photodetectors 236.

As shown in FIGS. 4 and 5, optical outputs 237 of the demultiplexer 235 are directly optically coupled to the respective photodetectors 236 without any intermediate optical components such as lenses or fibers. Where the demultiplexer 235 is an AWG, for example, the light exits the waveguides of the AWG and enters the photodetectors 236 without passing through any medium other than air. As such, the AWG may be designed and configured without components (e.g., a glass rail) used to couple the AWG to a fiber array, which allows the direct optical coupling. The waveguides in the AWG may be modified to account for any optical changes resulting from the removal of any such components, such as changes in the index of refraction or other changes in the light path.

Referring to FIGS. 6-9, direct optical coupling of the array of photodetectors 236 to the respective optical outputs 237 of the optical demultiplexer 235 is shown and described in greater detail. In the illustrated embodiment, the array of photodetectors 236 include PIN type photodiodes 270 mounted on a photodetector mounting bar 272 together with associated transimpedance amplifiers (TIAs) 274. The photodiodes 270 are aligned with and spaced from the optical outputs 237 of the demultiplexer 235 with a spacing that is close enough to achieve a coupling efficiency of 95% or greater with an alignment tolerance (i.e., in the X, Y axes) high enough to allow passive alignment (e.g., an alignment tolerance of at least about 20 microns). In one example, the photodiodes 270 may be spaced from the optical outputs 237 (i.e., in the Z axis) in a range of 10-40 microns, which allows a coupling efficiency greater than 95% and an alignment tolerance of about 20 microns. In the illustrated embodiment of a 16 channel ROSA, for example, 16 photodiodes 270 are aligned with 16 optical outputs 237 and electrically connected to 16 associated TIAs 274, respectively.

Figure 8:
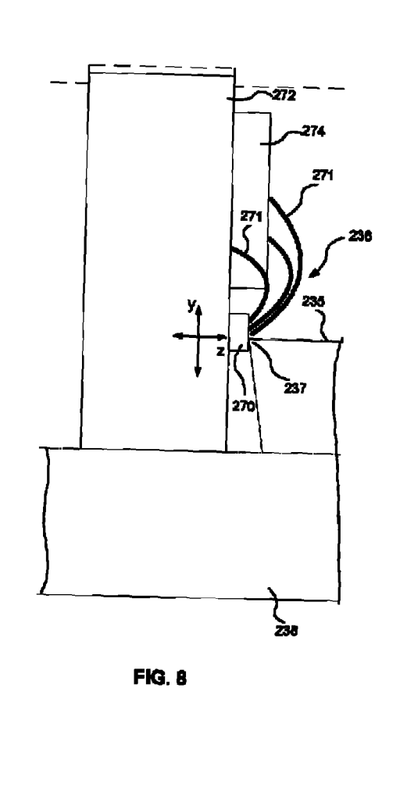
FIG. 8 is an enlarged side view of a photodetector directly optically coupled to an optical output of an optical demultiplexer and wire bonded to an associated transimpedance amplifier (TIA).
Figure 9:
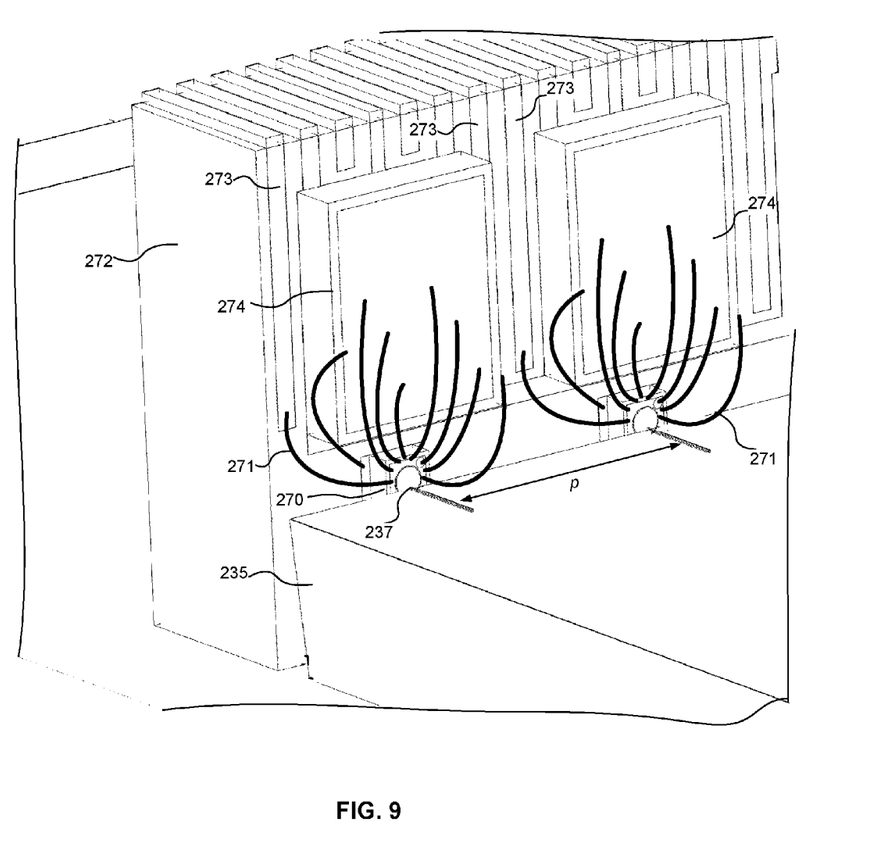
FIG. 9 is an enlarged perspective view of photodetectors directly optically coupled to optical outputs of an optical demultiplexer and wire bonded to associated TIAs.

As shown in FIGS. 8 and 9, each of the photodiodes 270 is electrically connected to each of the TIAs 274 using wire bonding. Wires 271 extend from wire bonding points on the photodiodes 270 to wire bonding points on the associated TIAs 274. Wires 271 also extend between the photodiodes 270 and/or TIAs 274 and conductive paths or pads on the mounting bar 272, for example, to ground paths 273. Although one embodiment includes nine (9) wires 271 between each photodiode/TIA pair, as shown in FIG. 9, other numbers of wires may also be used. The photodiodes 270 are designed and configured with wire bonding points arranged in a pattern (e.g., using a cross over design) such that the wires 271 do not interfere with the optical demultiplexer 235, thereby allowing the direct optical coupling with sufficient proximity to achieve the desired coupling efficiency (e.g., 95% or greater) and with a tolerance alignment high enough to allow passive alignment (e.g., at least 20 microns). In other words, the wire bonding points are arranged on the region of each of the photodiodes 270 that does not oppose the demultiplexer 235 when directly optically coupled. Where the optical multiplexer 235 is about 0.7 mm thick, for example, the wire bond points may be located on a region of the mounted photodiode 270 that extends above 0.8 mm measured from the ROSA housing bottom portion 238. Designing and configuring an AWG without a glass rail for connecting to a fiber array, as discussed above, also prevents interference with the wire bonding and allows the close proximity of the photodiodes 270 to the respective optical outputs 237.

The photodiodes 270 may also be spaced sufficiently on the mounting bar 272 (i.e., in the X axis) to allow each of the photodiodes 270 to be connected to a floating ground. Connecting the photodiodes 270 to a floating ground instead of a common ground may prevent loss of receiver sensitivity. The floating grounds may include the ground paths 273 on the mounting bar 272 between the TIAs 274. Thus, the TIAs 274 are spaced on the mounting bar 272 sufficiently to allow space for the ground paths 273 between the TIAs 274, and the photodiodes 270 associated with each of the TIAs 274 are mounted with a pitch p corresponding to the pitch p of the TIAs 274. In one example, where the TIAs 274 are each about 1 mm wide, the TIAs 274 and the photodiodes 270 have a pitch p on the mounting bar 272 greater than 1 mm and more specifically about 1.375 mm. In one embodiment, the optical demultiplexer 235 may be an AWG designed with the optical outputs 237 having a pitch p matching that of the photodiodes 270 when mounted on the mounting bar 272.

Referring to FIGS. 10A-10E, a passive alignment method is described in greater detail. Passive alignment generally refers to alignment without actively directing light into a photodiode and monitoring the photodiode output. This passive alignment method may be used to align each of the photodiodes 270 (e.g., in the X and Y axis) with each of the respective optical outputs 237 of the optical demultiplexer 235 to provide the desired coupling efficiency. Although a passive alignment method is described herein, active alignment methods may also be used to provide alignment of the photodetectors in the ROSA described above.

Figure 10A:
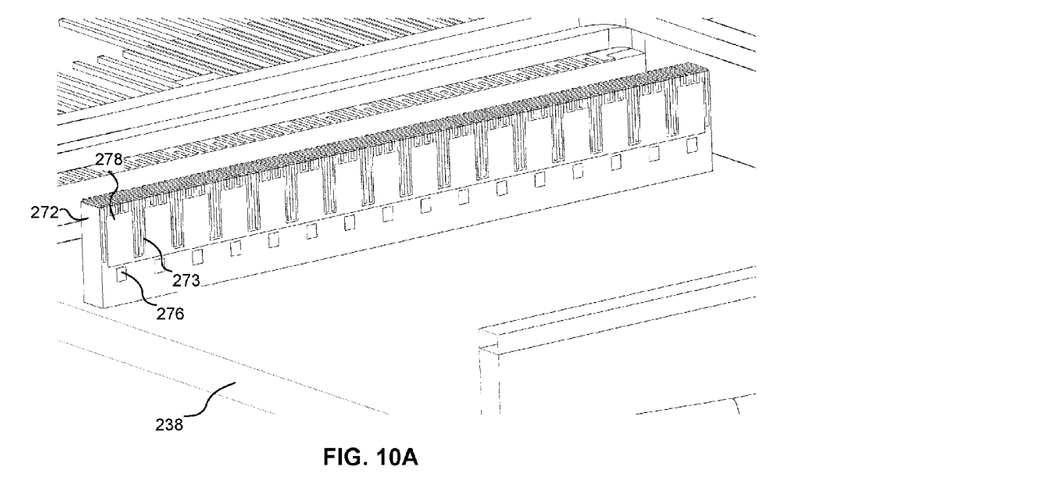
FIGS. 10A-10E illustrate a method of passively aligning and directly optically coupling an array of photodetectors with respective optical outputs of an optical demultiplexer.

The photodetector mounting bar 272 is mounted to the ROSA bottom portion 238 without the photodiodes and TIAs, as shown in FIG. 10A. The mounting bar 272 may be mounted using an adhesive, such as epoxy, or other suitable techniques. The mounting bar 272 includes photodiode conductive pads 276 and TIA conductive pads 278 with a pitch p corresponding to the desired pitch of the mounted photodiodes and TIAs. The ground paths 273 are located on the mounting bar 272 between the TIA conductive pads 278.

Figure 10B:
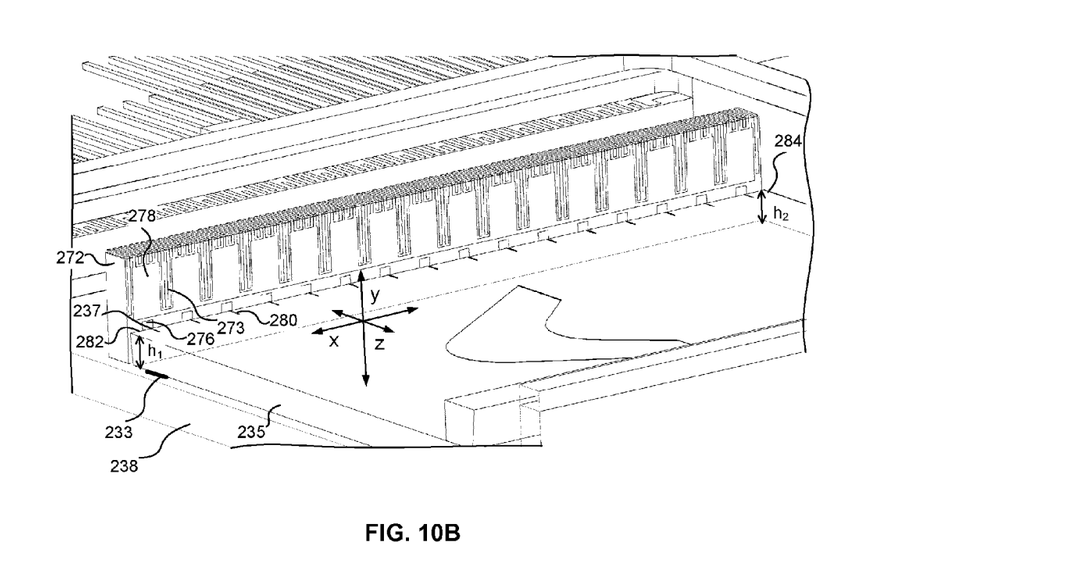

The optical demultiplexer 235 (e.g., the AWG) is also mounted to the ROSA bottom portion 238, as shown in FIG. 10B. Although the illustrated embodiment shows the mounting bar 272 being mounted before the optical demultiplexer 235, the demultiplexer 235 may also be mounted before the mounting bar 272. In either case, the mounting bar 272 (i.e., without the photodiodes and TIAs) and the demultiplexer 235 are mounted with a spacing (e.g., along the Z axis) that is sufficient to accommodate the photodiodes with the desired close proximity spacing (e.g., 10-40 microns) for direct optical coupling with the desired coupling efficiency. The demultiplexer 235 includes alignment markings 280 that mark the locations of the optical outputs 237 of the optical demultiplexer 235 along the X axis. The mounting bar 272 and the optical demultiplexer 235 are mounted to the ROSA housing base portion 238 such that the alignment markings 280 align with respective photodiode conductive pads 276 on the mounting bar 272.

The optical demultiplexer 235 is mounted to the ROSA housing base portion 235 using an adhesive 233, such as an epoxy. Because the adhesive 233 may have different thicknesses at different sides 282, 284 of the optical demultiplexer 235, the position of the optical outputs 237 in the Y axis may vary relative to the ROSA housing base portion 238. To account for this variation, distances $h_1$, $h_2$ are measured at each side 282, 284 of the optical demultiplexer 235 from the ROSA housing base portion 238 to a location on the optical demultiplexer 235 (e.g., the top of an AWG chip). These distances may then be used to provide passive alignment of the photodiodes 270 with the optical outputs 237 in the Y axis as disclosed in greater detail below.

Figure 10C:
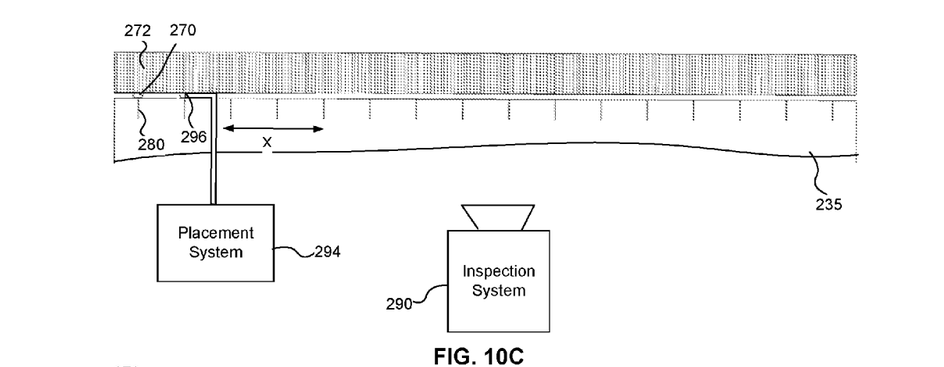
Figure 10D:
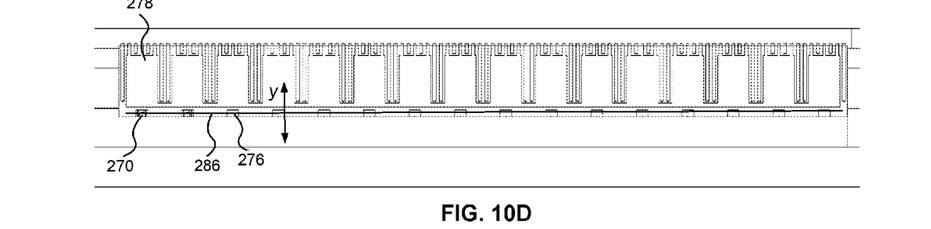
Figure 10E:
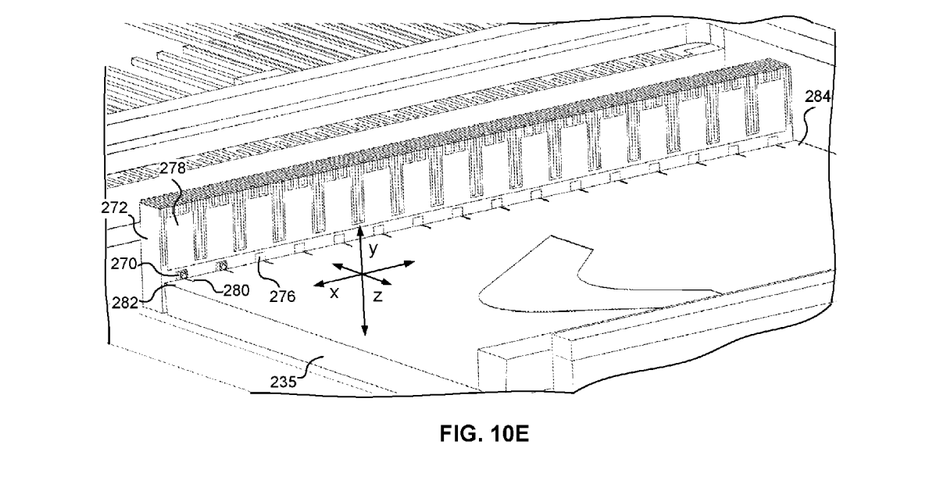

After the mounting bar 272 and the optical demultiplexer 235 have been mounted to the ROSA housing base portion 238, each of the photodiodes 270 may be positioned between the mounting bar 272 and the optical demultiplexer 235 and aligned in the X and Y axes at each of the respective locations as shown in FIGS. 10C-10E. Each aligned photodiode 270 may be mounted to the photodiode conductive pad 276, for example, using a conductive epoxy applied to the conductive pad 276 and/or to the photodiode 270 prior to positioning and aligning the photodiode 270. Conductive epoxy, such as silver epoxy, allows cathodes of the photodiodes to be electrically connected to the respective photodiode conductive pads 276.

To provide the passive alignment in the illustrated embodiment, an inspection system 290 is positioned for imaging the photodetector mounting bar 272. The inspection system 290 may include a microscope and inspection projector such as the type known for use in inspecting small areas for opto-electronic assembly. The inspection system 290 generates an alignment line 286 based on the measured distances $h_1$, $h_2$ at the respective sides 282, 284 of the optical demultiplexer 235 and projects or displays the alignment line 286 on the mounting bar 272 for use in aligning the photodiodes in the Y axis (see FIG. 10D). The alignment line 286 corresponds to the variation in position of the optical outputs 237 in the Y axis relative to the ROSA housing base portion 238.

The alignment line 286 may be formed between two points determined from the measured distances $h_1$, $h_2$. For an AWG having a thickness of 0.7 mm, for example, if the measured distances $h_1$, $h_2$ are 0.78 mm and 0.795 mm, respectively, the alignment line 286 will have a variance of 15 microns between the ends (e.g., at the positions of the photodiode 1 and photodiode 16). Because the optical outputs 237 are aligned linearly from the first side 282 to the second side 284 of the demultiplexer 235, the alignment line 286 generated from the distances $h_1$, $h_2$ measured at each of the sides 282, 284 may be used to align all of the photodiodes 270 in the Y axis without having to measure the distances at each of the locations of the optical outputs 237.

While viewing the mounting bar 272 with the inspection system 290, the individual photodiodes 270 may be positioned, aligned and mounted. Each of the photodiodes 270 may be aligned in the X axis using the alignment markings 280 and may be aligned in the Y axis using the alignment line 286. According to one method, the photodiodes 270 may be manually positioned (e.g., using tweezers). According to another method, a placement system 294 may be used to automatically position each photodiode 270 to the aligned location. The placement system 294 may include automated machines known for use in holding and positioning small optical or opto-electronic components. One example of a placement system 294 includes a vacuum tip 296 capable of holding the photodiode 270.

After all of the photodiodes 270 have been aligned and mounted, the TIAs (not shown in FIGS. 10A-10E) may be mounted to the TIA conductive pads 278, for example, using a silver epoxy or other conductive epoxy. The photodiodes, TIAs and conductive paths may then be wire bonded to provide the electrical connections.

Accordingly, the multi-channel optical transceiver module, consistent with embodiments described herein, provides a direct optical coupling between an array of photodetectors and a plurality of optical outputs of an optical demultiplexer in a relatively small space and with a relatively high coupling efficiency. A passive alignment method may also be used to align the photodetectors with the optical outputs of the optical demultiplexer with the relatively high coupling efficiency.

Consistent with an embodiment, a multi-channel receiver optical subassembly (ROSA) includes a ROSA housing and an optical demultiplexer located in the ROSA housing. The optical demultiplexer includes multiple optical outputs corresponding to multiple channels and is configured to receive a wavelength division multiplexed (WDM) optical signal on multiple channel wavelengths and to demultiplex the WDM optical signal to produce demultiplexed optical signals on the multiple channel wavelengths, respectively. The multi-channel ROSA also includes an array of photodetectors located in the ROSA housing and aligned with and directly optically coupled to the multiple optical outputs, respectively, of the optical demultiplexer.

Consistent with another embodiment, a multi-channel optical transceiver module includes a transceiver housing having a transceiver optical connection end and a transceiver electrical connection end. The transceiver optical connection end of the transceiver housing is configured to provide an optical connection and the transceiver electrical connection end of the transceiver housing being configured to provide an electrical connection. The multi-channel optical transceiver module also includes a circuit board located in the transceiver housing proximate the transceiver housing bottom portion. The circuit board includes RF inputs located proximate the transceiver electrical connection end of the transceiver housing. The multi-channel optical transceiver module further includes a multi-channel transmitter optical subassembly (TOSA) located in the transceiver housing and electrically connected to the circuit board. The TOSA is configured to transmit a wavelength division multiplexed (WDM) optical signal on multiple channel wavelengths. The multi-channel optical transceiver module also includes a multi-channel receiver optical subassembly (ROSA) located in the transceiver housing and electrically connected to the circuit board. The ROSA is configured to receive a wavelength division multiplexed (WDM) optical signal on multiple channel wavelengths. The ROSA includes an optical demultiplexer including multiple optical outputs corresponding to multiple channels. The optical demultiplexer is configured to receive a wavelength division multiplexed (WDM) optical signal on multiple channel wavelengths and to demultiplex the WDM optical signal to produce demultiplexed optical signals on the multiple channel wavelengths, respectively. The ROSA also includes an array of photodetectors aligned with and directly optically coupled to the multiple optical outputs, respectively, of the optical demultiplexer.

Consistent with a further embodiment, a method is provided for aligning photodetectors to optical outputs of an optical demultiplexer in a multi-channel receiver optical subassembly (ROSA). The method includes: mounting an optical demultiplexer on a ROSA housing base portion, wherein the optical demultiplexer includes alignment markings indicating locations of optical outputs of the optical demultiplexer along a first axis, wherein the optical demultiplexer is spaced from a photodetector mounting bar; measuring at least first and second distances from the ROSA housing base portion to the optical demultiplexer at respective first and second sides of the optical demultiplexer; displaying an alignment line on the photodetector mounting bar for indicating a photodetector position along a second axis, the alignment line extending between first and second points on the photodetector mounting bar corresponding to the first and second distances measured at the first and second sides of the optical demultiplexer; and mounting photodetectors on the photodector mounting bar, wherein each of the photodectors is aligned along the first axis with the one of the alignment markings and aligned along the second axis with the alignment line such that the photodectors are passively aligned with respective ones of the optical outputs of the optical demultiplexer.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of aligning photodetectors to optical outputs of an optical demultiplexer in a multi-channel receiver optical subassembly (ROSA), the method comprising:
   mounting an optical demultiplexer on a ROSA housing base portion, wherein the optical demultiplexer includes alignment markings indicating locations of optical outputs of the optical demultiplexer along a first axis, wherein the optical demultiplexer is spaced from a photodetector mounting bar;
   measuring at least first and second distances from the ROSA housing base portion to the optical demultiplexer at respective first and second sides of the optical demultiplexer;
   displaying an alignment line on the photodetector mounting bar for indicating a photodetector position along a second axis, the alignment line extending between first and second points on the photodetector mounting bar corresponding to the first and second distances measured at the first and second sides of the optical demultiplexer; and
   mounting photodetectors on the photodector mounting bar, wherein each of the photodectors is aligned along the first axis with the one of the alignment markings and aligned along the second axis with the alignment line such that the photodectors are passively aligned with respective ones of the optical outputs of the optical demultiplexer.

2. The method of claim 1 wherein the photodetectors are spaced from the optical outputs by a distance of 10-40 microns.

3. The method of claim 1 wherein the optical outputs of the optical demultiplexer have a pitch of at least 1 mm.

4. The method of claim 1 further comprising manually positioning the photodetectors to aligned the photodetectors along the first axis and the second axis.

5. The method of claim 1 further comprising automatically positioning the photodetectors to aligned the photodetectors along the first axis and the second axis.

6. The method of claim 1 further comprising mounting the photodetector mounting bar to the ROSA housing base portion, wherein the mounting bar and the optical demultiplexer are spaced sufficiently to accommodate the photodetectors.

7. The method of claim 1 wherein the optical demultiplexer is mounted to the ROSA housing base portion using epoxy.

8. The method of claim 1 wherein the photodetectors are PIN type photodiodes, further comprising:
 mounting transimpedance amplifiers (TIAs) on the mounting bar adjacent to the photodiodes, respectively; and
 wire bonding the photodiodes to the TIAs, respectively.

* * * * *